US010389489B2

(12) United States Patent
Yi et al.

(10) Patent No.: US 10,389,489 B2
(45) Date of Patent: Aug. 20, 2019

(54) METHOD AND APPARATUS FOR CONFIGURING TIMING RELATIONSHIP BETWEEN HARQ-ACK AND PUSCH FOR MTC UE IN WIRELESS COMMUNICATION SYSTEM

(71) Applicant: LG ELECTRONICS INC., Seoul (KR)

(72) Inventors: Yunjung Yi, Seoul (KR); Hyangsun You, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/561,451

(22) PCT Filed: Apr. 15, 2016

(86) PCT No.: PCT/KR2016/003908
§ 371 (c)(1),
(2) Date: Sep. 25, 2017

(87) PCT Pub. No.: WO2016/167581
PCT Pub. Date: Oct. 20, 2016

(65) Prior Publication Data

US 2018/0123742 A1 May 3, 2018

Related U.S. Application Data

(60) Provisional application No. 62/148,147, filed on Apr. 15, 2015.

(51) Int. Cl.
*H04W 72/14* (2009.01)
*H04L 1/18* (2006.01)
(Continued)

(52) U.S. Cl.
CPC .............. *H04L 1/1854* (2013.01); *H04L 1/00* (2013.01); *H04L 1/08* (2013.01); *H04L 1/18* (2013.01); *H04L 1/1812* (2013.01); *H04L 1/1861* (2013.01); *H04L 5/0055* (2013.01); *H04W 72/14* (2013.01); *H04L 1/1678* (2013.01); *H04L 5/0094* (2013.01); *H04L 2001/0093* (2013.01)

(58) Field of Classification Search
None
See application file for complete search history.

(56) References Cited

U.S. PATENT DOCUMENTS

| | | | | |
|---|---|---|---|---|
| 2011/0243080 A1* | 10/2011 | Chen | H04W 74/0841 | 370/329 |
| 2013/0028213 A1* | 1/2013 | Ko | H04B 7/0623 | 370/329 |
| 2014/0376456 A1 | 12/2014 | Kim et al. | | |

OTHER PUBLICATIONS

Downlink control channel related issues for MTC—3GPP TSG RAN WG1 R1-151487 (Apr. 20-24, 2015).*
(Continued)

*Primary Examiner* — Yemane Mesfin
*Assistant Examiner* — Jeff Banthrongsack
(74) *Attorney, Agent, or Firm* — Lee, Hong, Degerman, Kang & Waimey

(57) ABSTRACT

A method and apparatus for transmitting a physical HARQ indicator channel (PHICH) in a wireless communication system is provided. A base station (BS) transmits multiple uplink (UL) grants for multiple user equipments (UEs), receives UL data from the multiple UEs, and transmits a group-common PHICH as a response to the UL data received from the multiple UEs.

20 Claims, 16 Drawing Sheets

(51) Int. Cl.

| | |
|---|---|
| ***H04L 1/00*** | (2006.01) |
| ***H04L 1/08*** | (2006.01) |
| ***H04L 5/00*** | (2006.01) |
| *H04L 1/16* | (2006.01) |

(56) References Cited

OTHER PUBLICATIONS

DL physical control channels for MTC—3GPP TSG RAN WG1 R1-150550 (Feb. 9-13, 2015).*
Intel Corporation, "On the physical downlink control channel for MTC," 3GPP TSG-RAN WG1 #80, R1-150078, Feb. 2015, 8 pages.
Sony, "PHICH Operation for MTC," 3GPP TSG-RAN WG1 #80, R1-150430, Feb. 2015, 6 pages.
Levono, "DL physical control channels for MTC," 3GPP TSG-RAN WG1 #80, R1-150550, Feb. 2015, 7 pages.
LG Electronics, "Downlink control channel related issues for MTC," 3GPP TSG-RAN WG1 #80bis, R1-151487, Apr. 2015, 11 pages.
PCT International Application No. PCT/KR2016/003908, Written Opinion of the International Searching Authority dated Jul. 25, 2016, 34 pages.

* cited by examiner

METHOD AND APPARATUS FOR CONFIGURING TIMING RELATIONSHIP BETWEEN HARQ-ACK AND PUSCH FOR MTC UE IN WIRELESS COMMUNICATION SYSTEM

CROSS-REFERENCE TO RELATED APPLICATIONS

This application is the National Stage filing under 35 U.S.C. 371 of International Application No. PCT/KR2016/003908, filed on Apr. 15, 2016, which claims the benefit of U.S. Provisional Application No. 62/148,147, filed on Apr. 15, 2015, the contents of which are all hereby incorporated by reference herein in its entirety.

BACKGROUND OF THE INVENTION

Field of the Invention

The present invention relates to wireless communications, and more particularly, to a method and apparatus for configuring a timing relationship between a hybrid automatic repeat request acknowledgement (HARQ-ACK) and a physical uplink shared channel (PUSCH) for a machine-type communication (MTC) user equipment (UE) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Some MTC UEs may be installed in the basements of residential buildings or locations shielded by foil-backed insulation, metalized windows or traditional thick-walled building construction. These MTC UEs may experience significantly greater penetration losses on the radio interface than normal LTE UEs. Thus, for these MTC UEs, coverage enhancement may be required. The MTC UEs in the extreme coverage scenario may have characteristics such as very low data rate, greater delay tolerance, and no mobility, and therefore, some messages/channels may not be required.

Current timing between channels may be required to be modified when coverage enhancement is used.

SUMMARY OF THE INVENTION

The present provides a method and apparatus for configuring a timing relationship between a hybrid automatic repeat request acknowledgement (HARQ-ACK) and a physical uplink shared channel (PUSCH) for a machine-type communication (MTC) user equipment (UE) in a wireless communication system. The present invention discusses timing relationship between channels, e.g. between an uplink (UL) grant and PUSCH or between PUSCH and physical HARQ indicator channel (PHICH) or between PUSCH and another UL-grant for retransmission, etc., when coverage enhancement (CE) is used.

In an aspect a method for transmitting, by a base station (BS), a physical HARQ indicator channel (PHICH) in a wireless communication system is provided. The method includes transmitting multiple uplink (UL) grants for multiple user equipments (UEs), receiving UL data from the multiple UEs, and transmitting a group-common PHICH as a response to the UL data received from the multiple UEs.

In another aspect, a base station (BS) in a wireless communication system is provided. The BS includes a memory, a transceiver, and a processor coupled to the memory and the transceiver. The processor is configured to control the transceiver to transmit multiple uplink (UL) grants for multiple user equipments (UEs), control the transceiver to receive UL data from the multiple UEs, and control the transceiver to transmit a group-common physical HARQ indicator channel (PHICH) as a response to the UL data received from the multiple UEs.

Timing relationship between channels can be defined efficiently when CE is used.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
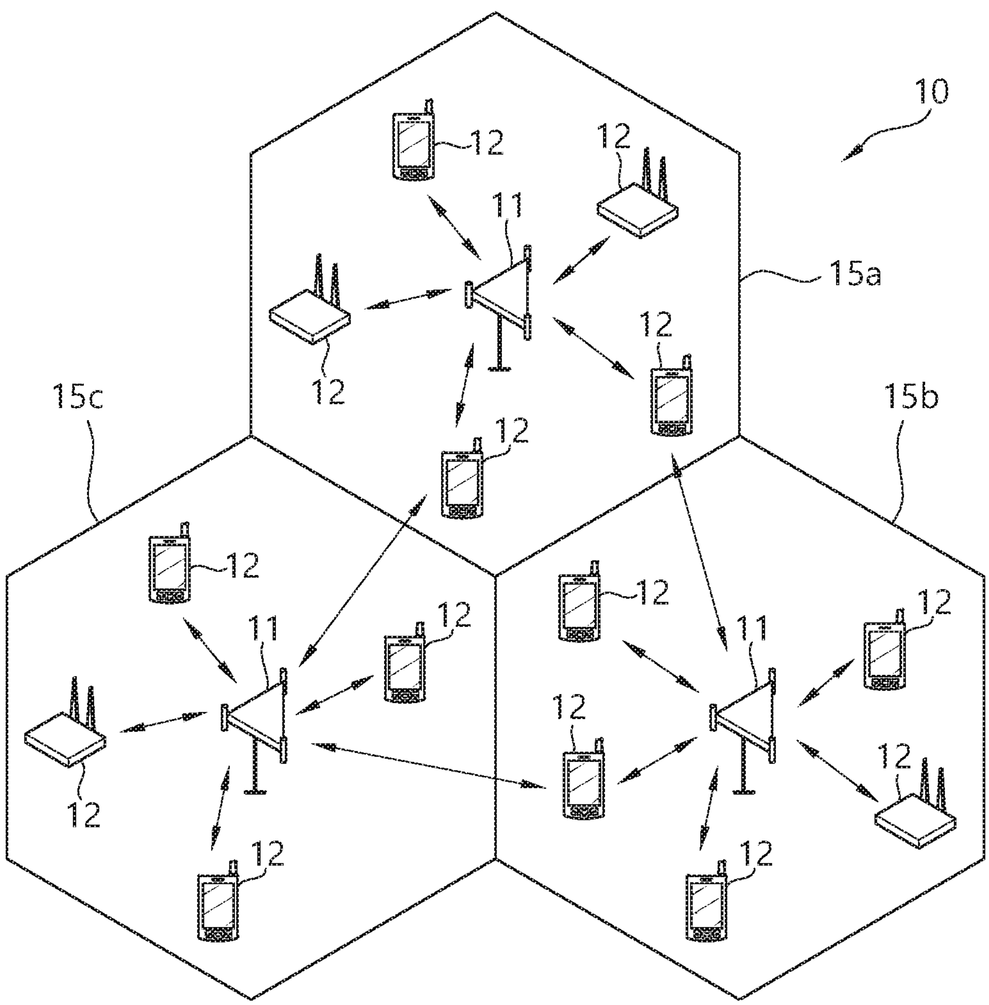
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15*a*, 15*b*, and 15*c* (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
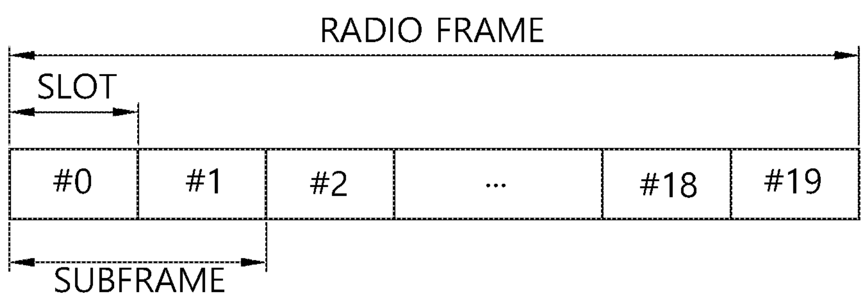
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of lms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
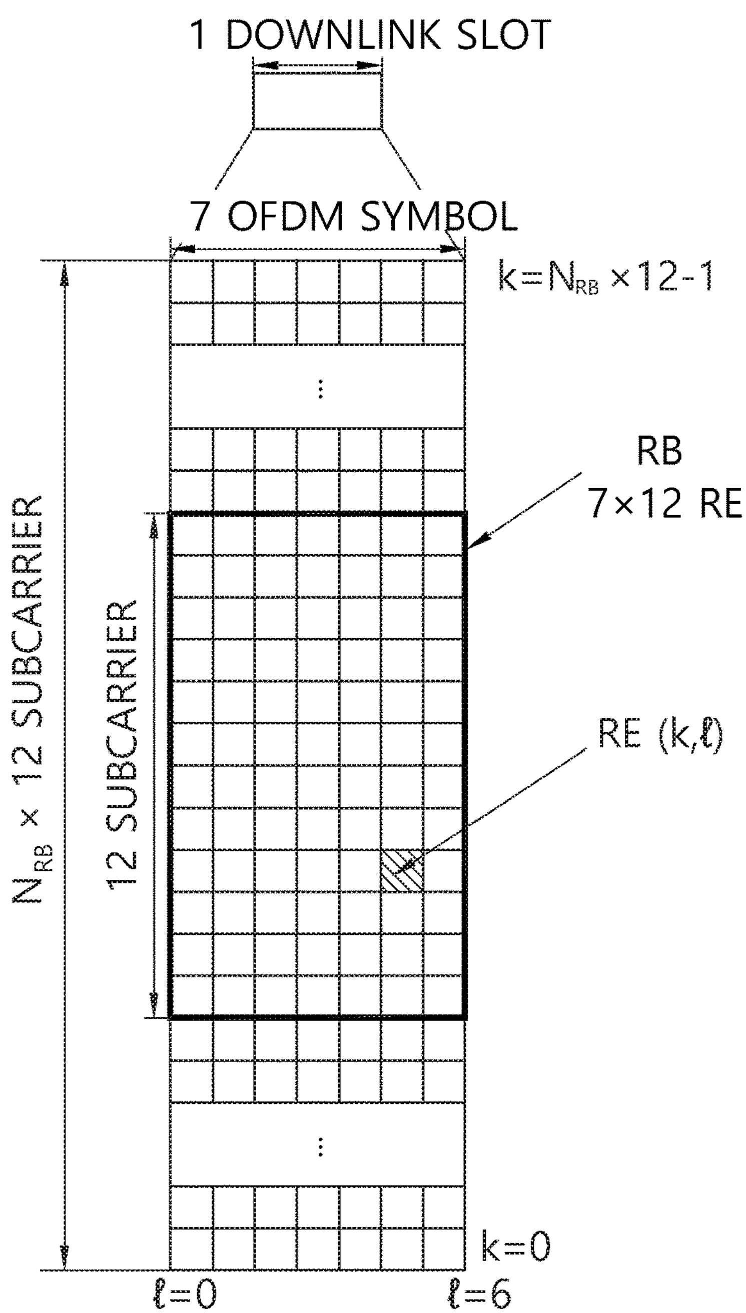
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
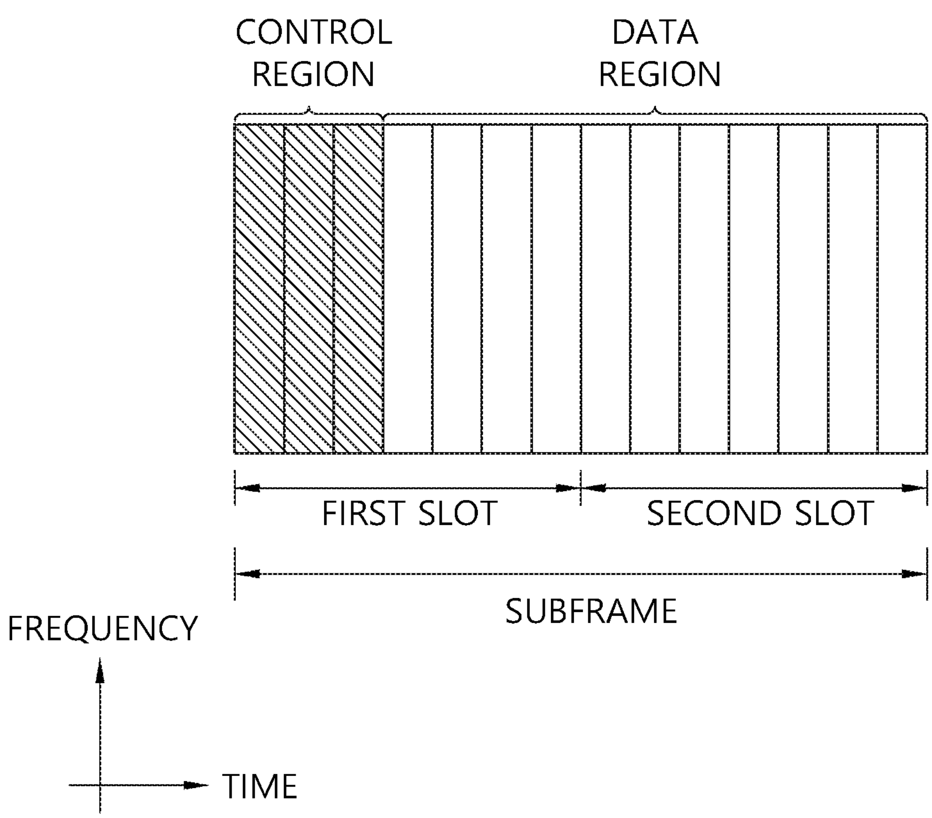
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
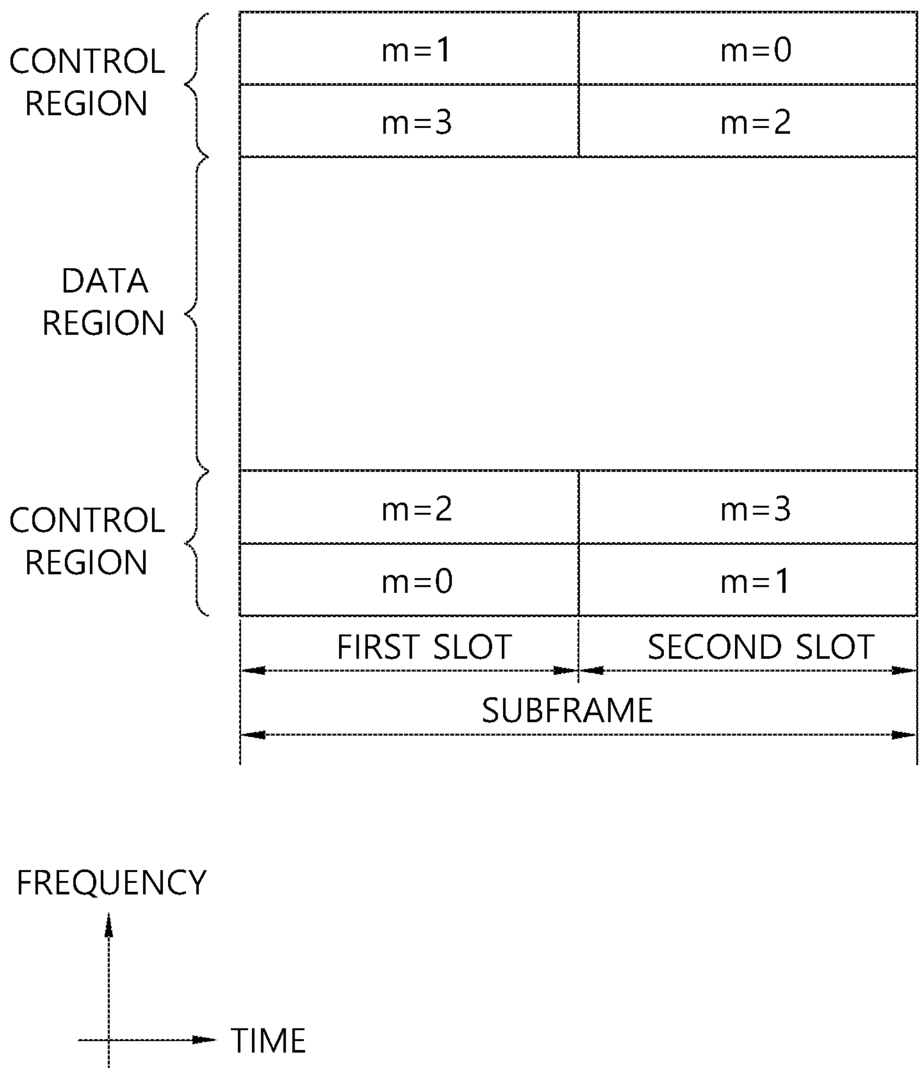
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of the UE used for machine type communication (MTC), reducing bandwidth is a very attractive option. To enable narrow-band MTC UEs, the current LTE specification shall be changed to allow narrow-band UE category. If the serving cell has small system bandwidth (smaller than or equal to bandwidth that narrow-band UE can support), the UE can attach based on the current LTE specification. Hereinafter, a MTC UE may be referred to as one of a UE requiring coverage enhancement (CE), a low cost UE, a low end UE, a low complexity UE, a narrow(er) band UE, a small(er) band UE, or a new category UE. Or, just a UE may refer one of UEs described above.

In the description below, a case where system bandwidth of available cells is larger than bandwidth that new category narrow-band UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

Before discussing timing between channels when CE is used, the followings may be assumed.

(1) DL grant and PDSCH may not be read at the same time. However, if frequency division multiplexing (FDM) is used between control channel and data channel, reading DL grant and PDSCH simultaneously may also be considered. However, in the description below, it is assumed that DL grant and the scheduled PDSCH are not read at the same time.

(2) Partial overlap between PUCCH and PUSCH may not be allowed. If starting subframe of PUCCH and starting subframe of PUSCH are aligned, piggybacked PUSCH may be transmitted.

For timing between channels when CE is used, overall, two approaches may be considered according to an embodiment of the present invention.

(1) First approach is to use the current timing relationship between channels. The gap may be applied between the last repetition subframe of the first channel and the first repetition subframe of the second channel. For example, PUSCH repetition may start after 4 ms from the last subframe of UL grant.

Figure 6:
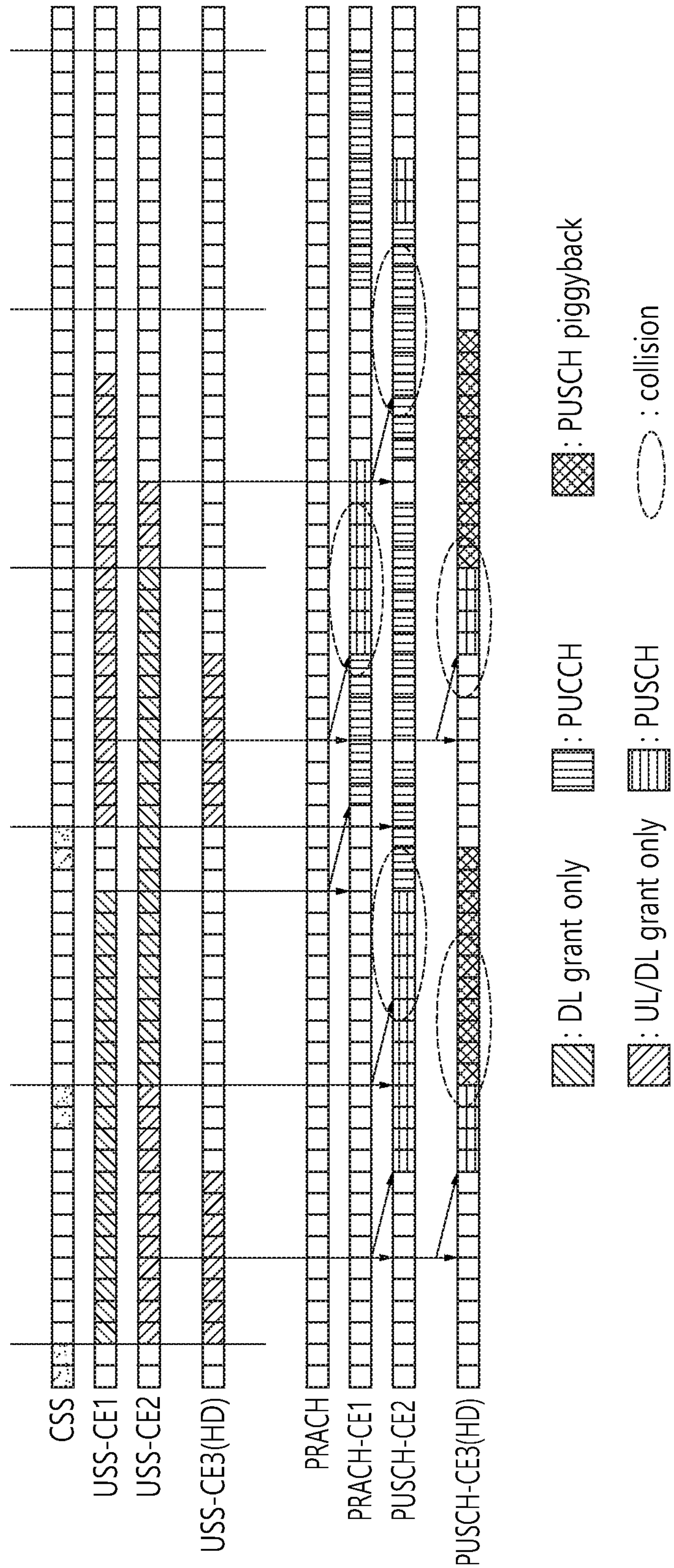
FIG. 6 shows an example of timing between channels based on current timing relationship according to an embodiment of the present invention.

FIG. 6 shows an example of timing between channels based on current timing relationship according to an embodiment of the present invention. Referring to FIG. 6, when current timing relationship is used, collision between PUCCH and PUSCH or between PUSCH and piggybacked PUSCH may happen when UL grant and DL grant are scheduled at the same time. That is, it becomes challenging to schedule UL grant and DL grant at the same time if the current timing relationship is used.

Figure 7:
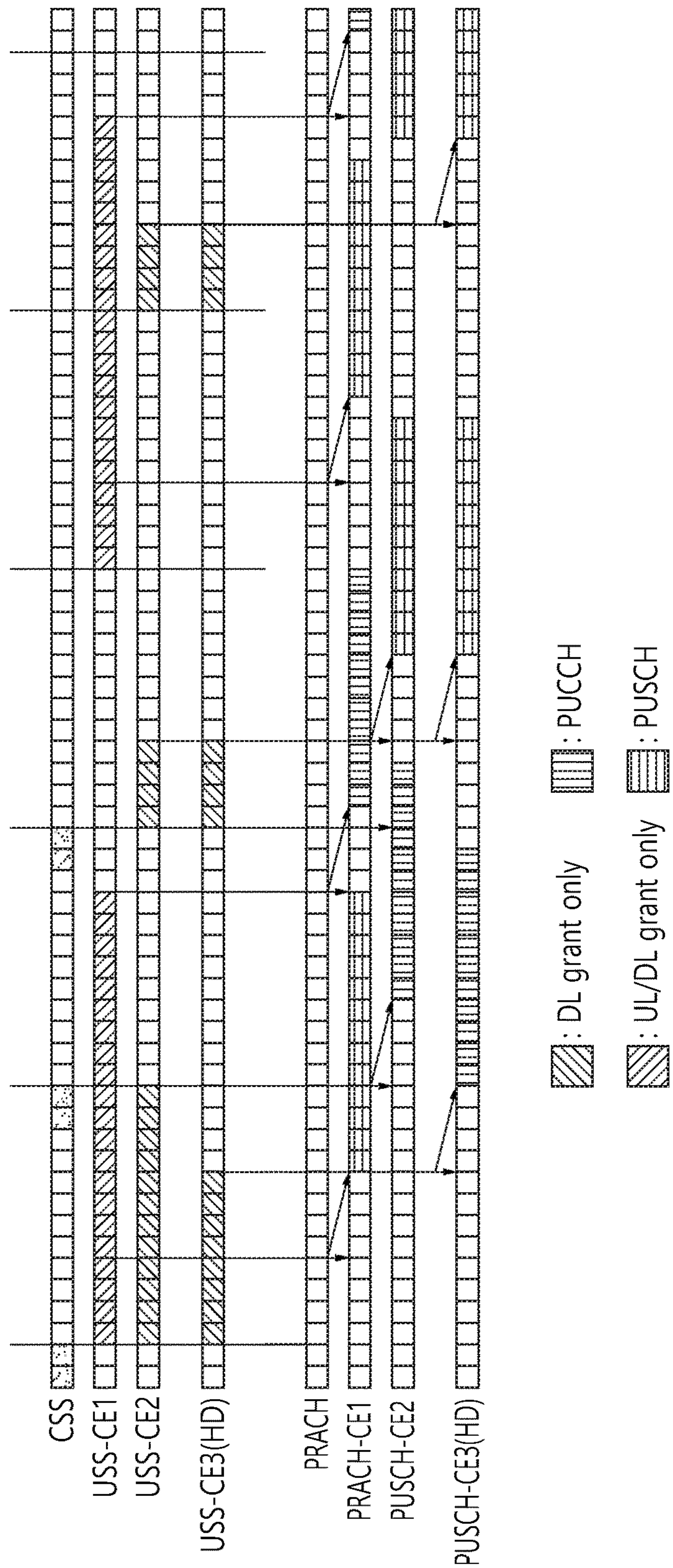
FIG. 7 shows another example of timing between channels based on current timing relationship according to an embodiment of the present invention.

FIG. 7 shows another example of timing between channels based on current timing relationship according to an embodiment of the present invention. Referring to FIG. 7, there is no collision between PUCCH and PUSCH since PUSCH repetition ends earlier than starting subframe of PUCCH (in case of USS-CE1). In this case, UL grant and DL grant may be simultaneously scheduled.

However, that PUSCH repetition ends earlier than starting subframe of PUCCH may not be easily assumed because repetition number of PUSCH is generally greater than PDSCH due to lower power and lower maximum coupling loss (MCL). Furthermore, many smart metering may have triggering type applications where UL transmission has generally higher transport block size (TBS) than DL transmission. In that case, DL and UL scheduling may be serialized. In TDD, this may be very inefficient particularly for TDD and full duplex FDD. Furthermore, multiplexing among UEs may become challenging in the same subband. To efficiently support multiple UEs, indication of subband for PUSCH and/or PDSCH may be considered in DL grant and UL grant.

(2) Second approach is to use new timing relationship between channels. For example, the followings may be considered for new timing relationship between channels.

- PDSCH may be scheduled right after or at the configured starting subframe set.
- PUCCH may be scheduled only at the configured starting subframe set. For HARQ-ACK, the first starting subframe of PUCCH may be set after K+4 subframe where K is the last subframe of PDSCH repetition. For CSI, PUCCH may be scheduled at the first starting subframe after (or equal to) the configured starting subframe of CSI or SR.
- PUSCH may be scheduled only at the configured starting subframe set. Semi-persistent scheduling (SPS) PUSCH may start at the first starting subframe after (or equal to) the configured SPS PUSCH.
- PHICH or PHICH-like DCI or UL grant may be scheduled at the first starting subframe of DCI.

Figure 8:
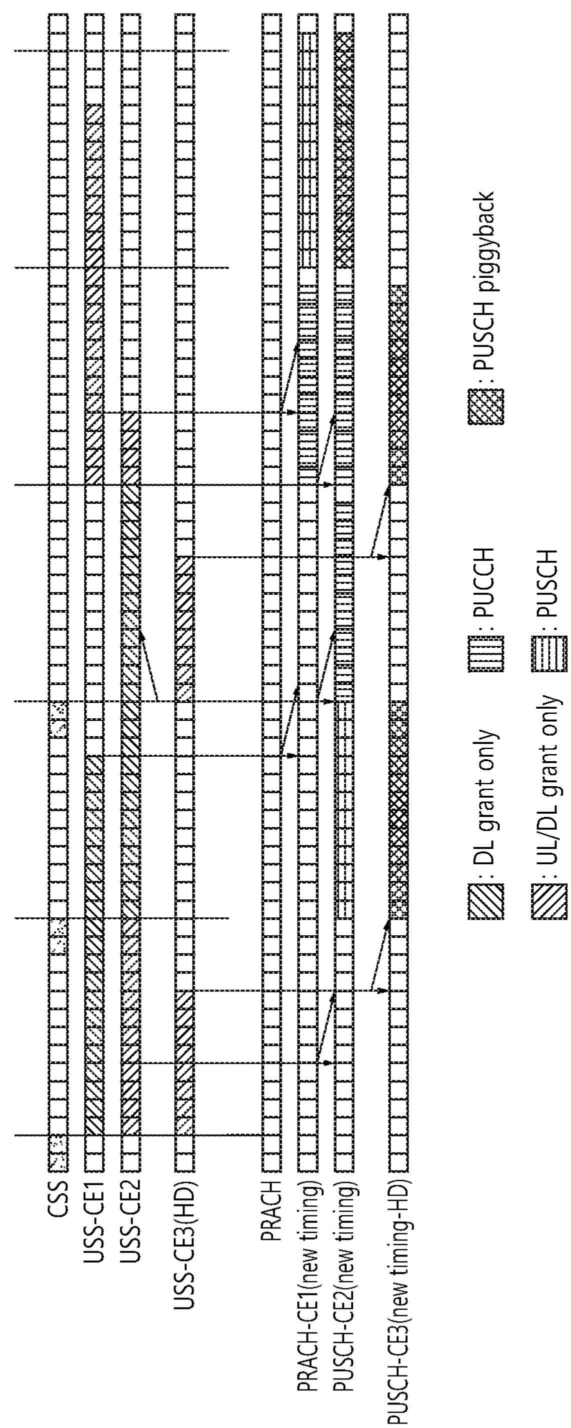
FIG. 8 shows an example of timing between channels based on new timing relationship according to an embodiment of the present invention.

FIG. 8 shows an example of timing between channels based on new timing relationship according to an embodiment of the present invention. Referring to FIG. 8, PUCCH is scheduled only at the configured starting subframe set. Also, PUSCH is scheduled only at the configured starting subframe set. Accordingly, there is no collision between PUCCH and PUSCH.

This approach, i.e. using new timing relationship between channels, may allow flexible network scheduling. The network may schedule multiple UEs and also schedule DL and UL simultaneously. For example, the starting subframe set of control channel may be the starting subframe sets for UL transmission. For PDSCH, the starting subframe set may be configured with offset which may be applied from the starting subframe set of control channels. Alternatively, if the repetition number of subframes used for control channel is fixed or configured for each UE, PDSCH may start after the end subframe of control channel repetition. One drawback of implicit mapping from the end subframe of control channel to the first subframe of data channel is that multiplexing of control channels of different UEs may not be easily supportable.

Figure 9:
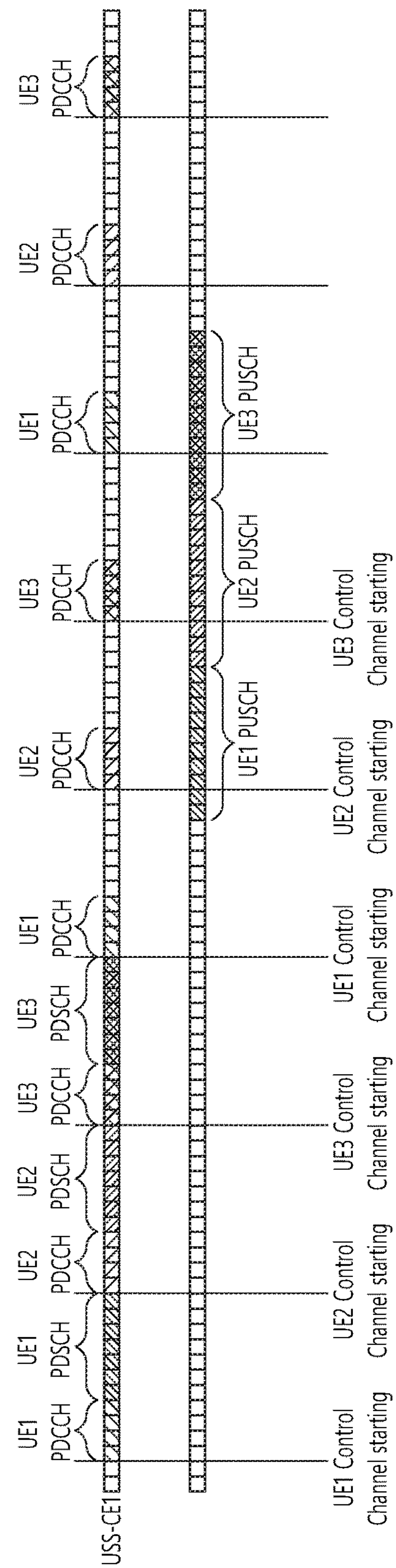
FIG. 9 shows an example of scheduling of multiple UEs in a same subband according to an embodiment of the present invention.

FIG. 9 shows an example of scheduling of multiple UEs in a same subband according to an embodiment of the present invention. Referring to FIG. 9, PDSCH of each UE starts after the end subframe of PDCCH of each UE.

A network may be able to schedule different UEs in different timing to avoid possible collision. However, DL scheduling of one UE may impact PUSCH scheduling of another UE if the number of PUSCH repetition is very high compared to PDSCH repetition. Thus, the gap between two UEs should be larger than the number of PUSCH repetition in a subband. However, it may be very challenging to fix the number of PUSCH repetition because it may change depending on TBS and modulation and coding scheme (MCS). Thus, the network may not be able to schedule other UEs in case of long PUSCH transmission.

Figure 10:
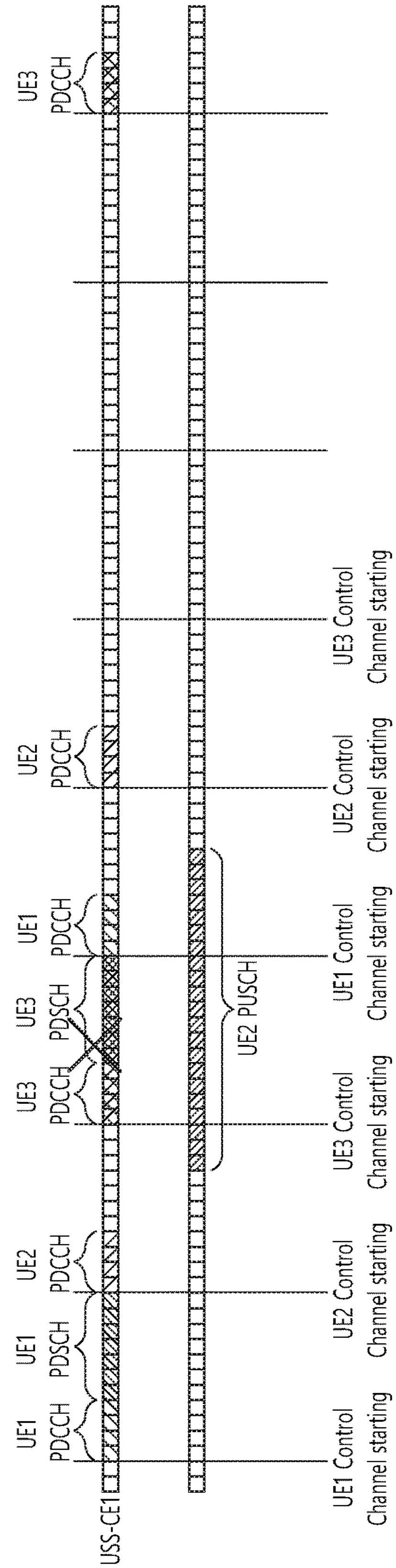
FIG. 10 shows another example of scheduling of multiple UEs in a same subband according to an embodiment of the present invention.

FIG. 10 shows another example of scheduling of multiple UEs in a same subband according to an embodiment of the present invention. Referring to FIG. 10, PUSCH of UE2 is scheduled for relatively long period. In this case, UE3 may not be scheduled.

Considering that repetition number for PUSCH is generally much larger than repetition number of PUCCH and PDSCH, separate subframe set for PUCCH and PUSCH may be considered. For example, PDCCH/PDSCH may start in every M frequency hopping subframe groups (FH-SFGs), which is a set of subframes used for the same frequency. On the other hand, PUSCH may start every K*M FH-SFGs where K may be the expected number of ratio between the repetition number of PUSCH and PDSCH. If this is allowed, at least K users may be multiplexed. To allow possible UL grant, initial offset may also be configured such that if the starting subframe set for control channel is (SFN % M)=0+offset, PUSCH may start (SFN % K*M)=0+offset+offset1, where offset1 is used for determining another offset for PUSCH. More particularly, the offset1 may be a size of PUCCH repetition. Alternatively, PUSCH may start (SFN % (K+1)*M)=0 to allow multiplexing of K users.

Figure 11:
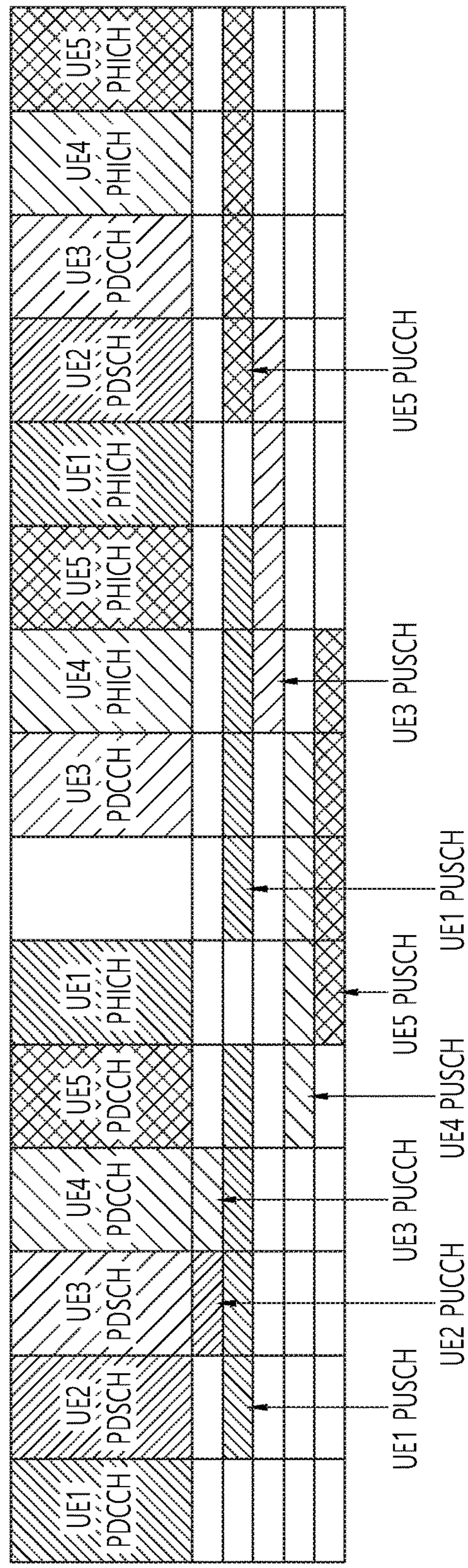
FIG. 11 shows an example of multiplexing of multiple UEs according to an embodiment of the present invention.

FIG. 11 shows an example of multiplexing of multiple UEs according to an embodiment of the present invention. FIG. 11 shows multiplexing of multiple UEs when current timing relationship between channels is used. If the repetition number of PUCCH is generally smaller than the repetition number of PDSCH, dedicated resource (e.g. the lowest or highest PRB in a subband) may be used for PUCCH resource which is shared among different UEs by time division multiplexing (TDM). Other resource may be used for PUSCH transmission. To avoid the collision between different PUSCHs and between PUCCH/PUSCHs, indication of PRB where PUSCH or PUCCH needs to be transmitted may be dynamically signaled via DCI (i.e. UL grant for PUSCH and DL grant for PUCCH).

Further, how to transmit PHICH for PUSCH transmissions needs to be considered. Regardless of ending time of PUSCH, PHICH may be transmitted via DCI, which is transmitted via enhanced PHCCCH (EPDCCH) in cell-specific search space (CSS) or EPDCCH in UE-specific search space (USS), with separate RNTI from C-RNTI. If current timing relationship is used, PHICH (or equivalent channel) may be expected to be transmitted at the next available subframe where control channel repetition is expected to start. If different ending time of PUSCH is used, multiplexing of PHICH to one instance may become challenging. Thus, for this case, individual DCI (retransmission UL grant) type PHICH may be more suitable. For retransmission, a new PRB location may be used to avoid collision.

In case current timing relationship is used, group-common PHICH for multiple PUSCH transmission may be applied. In the description below, PHICH may mean PHICH or PHICH-equivalent channel, e.g. a common DCI carrying multiple ACK/NACK for multiple UEs or multiple PUSCH transmissions. The number of repetition of PUSCH may be much smaller than the periodicity of control channel. Thus, it is generally possible that multiple PUSCH transmission has been completed before the next starting subframe. Group-common PHICH may be transmitted via a dedicated subband or the same subband where CSS is transmitted. For example, multiple UL grants may be scheduled in different subbands or in different time. PHICH may be transmitted in a different dedicated subband. PHICH starting subframe or a control starting subframe of dedicated subband may be aligned with starting subframe set of USS. From a UE perspective, after transmitting PUSCH, instead of monitoring USS subband, a UE may monitor a dedicated subband for PHICH or a CSS subband. By this mechanism, the expected UE behavior is as follows.

As the highest priority, a UE may monitor the configured USS subband.

In case UL grant is received, the UE may expect that USS DL grant will not be transmitted until PUSCH transmission finishes. The expected PHICH timing of PUSCH may be the next available PHICH occasion from the last scheduled repetition of PUSCH (i.e. no early termination is easily possible). In this case, the UE may monitor CSS subband for possible broadcast transmission. However, PHICH may be expected to be transmitted at a given time (i.e. no monitoring of PHICH is necessary in other times). When PHICH-ACK is received, the UE may switch to USS subband to start monitoring of USS.

In case DL grant is received, the UE may expect that UL grant will not be transmitted until PUCCH-ACK transmission finishes. Alternatively, a UE may expect that UL grant will not be transmitted until PUCCH is transmitted. When UL grant is received before PUCCH-ACK is transmitted, the UE may assume that data will not be retransmitted due to NACK-to-ACK false detection at the network side. It may flush the HARQ buffer. In other words, before DL transmission is completed, if UL process starts, the UE may assume that the current DL is terminated. More specifically, this may be assumed only when PUSCH and PUCCH may collide. In other words, the network may schedule very short PUSCH transmission which can be finished before PUCCH transmission and may not cause any collision. In such a case, a UE may expect any USS as long as UE does not transmit PUSCH. More generally, the subband where a UE is expected to monitor may be different depending on whether the UL grant is scheduled or not. UL grant and PHICH may be transmitted in different subbands.

Figure 12:
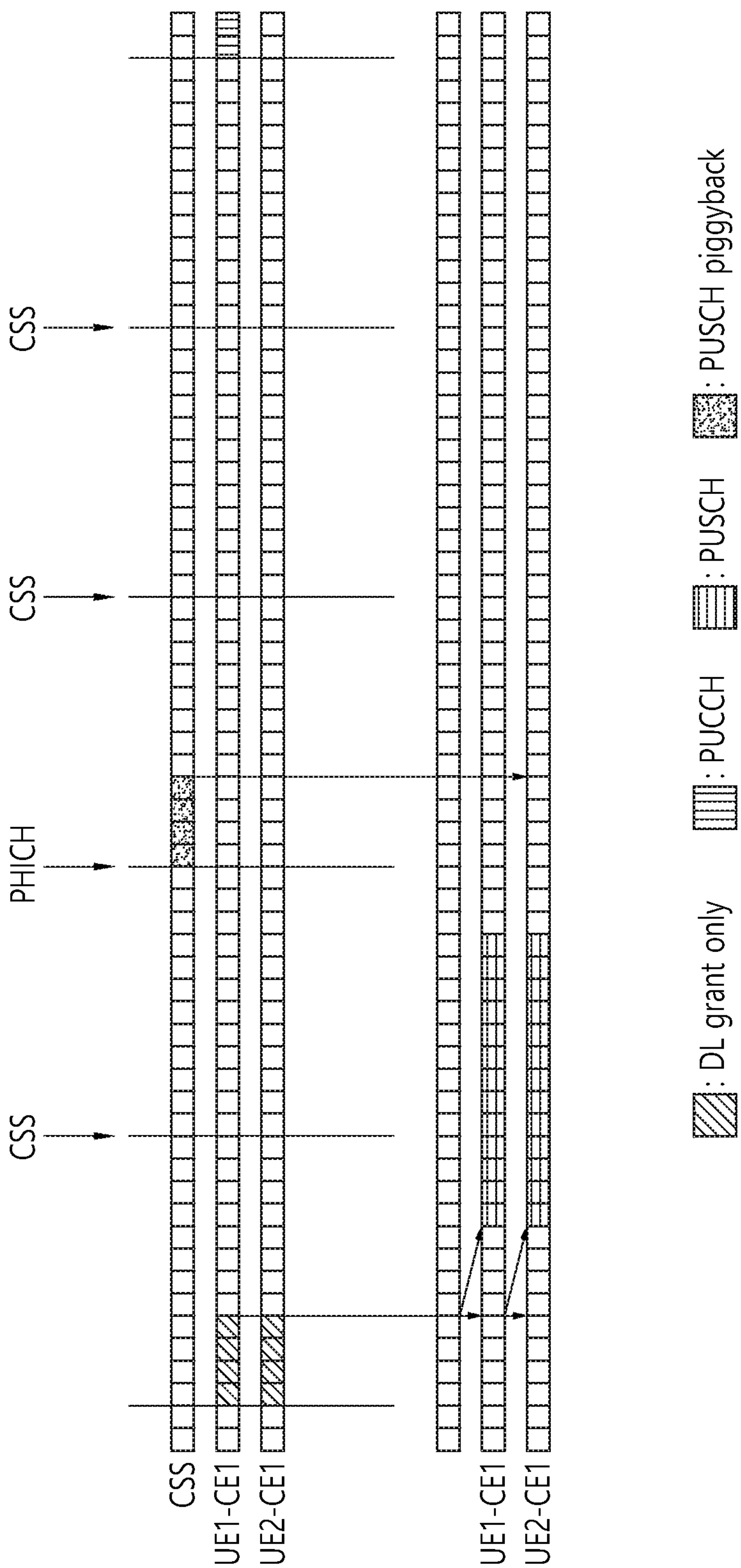
FIG. 12 shows an example of a group-common PHICH based on current timing relationship according to an embodiment of the present invention.

FIG. 12 shows an example of a group-common PHICH based on current timing relationship according to an embodiment of the present invention. Referring to FIG. 12, as a response to PUSCH transmissions of UE1 and UE2, a group-common PHICH is transmitted in CSS. Accordingly, there is no collision between PUSCH and PUCCH.

Further, multiplexing of multiple UL grants may be allowed such that starting time of PUSCH can be aligned. This may increase the overall reading time of control channel. However, it may allow aligned timing among different PUSCHs such that group-common PHICH becomes feasible.

Figure 13:
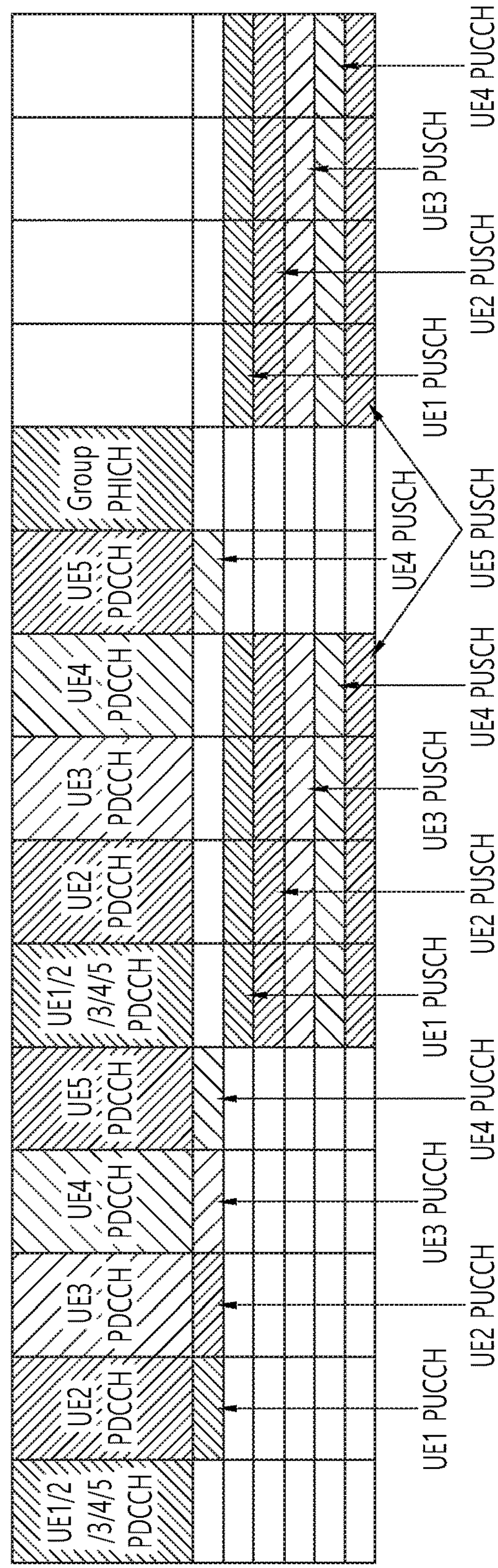
FIG. 13 shows another example of multiplexing of multiple UEs according to an embodiment of the present invention.

FIG. 13 shows another example of multiplexing of multiple UEs according to an embodiment of the present invention. Referring to FIG. 13, UL grants of UE1, UE2, UE3, UE4 and UE5 are multiplexed. Accordingly, PUSCH timings of UE1, UE2, UE3, UE4 and UE5 are aligned. Therefore, a group-common PHCIH may be transmitted.

When new timing relationship is used, UE-group-specific PHICH may also be considered because the timing among PUSCHs is fairly aligned. Further, when new timing relationship is used, PHICH may be transmitted per each subband where a UE expects to monitor USS.

In this case, group-common PHICH may be constructed as follows.

When up to Y PUSCHs may be multiplexed between PUSCH-SFG (i) and PUSCH-SFG (i+1) where PUSCH-SFG (i) is the starting subframe for i-th PUSCH repetition transmission in a subband, totally Y PHICH resources may be used as a bitmap with size Y. In this case, j-th bit of the bitmap may indicate ACK/NACK of PUSCH transmission scheduled at j-th resource. For example, if the resource unit is one PRB, j-th resource may mean j-th PRB within a subband. If the resource unit is 3 subcarriers, j-th resource may mean 3 subcarriers among possibly 24 resource units in a subband assuming subband size is 6 PRBs.

The UE may expect to receive PHICH in the next control channel monitoring/starting subframe after the end of PUSCH repetition (scheduled)+K subframes. K may be larger than 1 (e.g. K=4).

Separate PHICH may be used between different CE levels. Or, one PHICH may be used for all CE levels per subband. However, separate PHICH may be used for low cost UE with normal coverage and low cost UE with CE. In such a case, different RNTI configuration may be considered.

In other words, PHICH resource for each UE may be determined as the first next starting subframe of control channel after PUSCH transmission+K subframe. In this case, no additional signaling of PHICH resource may be necessary. Individual RNTI may be configured to each UE. For the index among common DCI to locate ACK/NACK, resource location may be used to indicate which bit to read.

In general, control channel among different UEs or between different HARQ-processes may be multiplexed by TDM or via search space. In case it is multiplexed via search space, because it allows limited number of control channels to be multiplexed due to limited number of PRBs used for control channel, even though multiplexing is allowed, multiplexing by TDM may also be necessary. Thus, multiple starting subframe set per each period of control channel transmission may be considered. In such a case, aligning transmission time of PUSCH may be beneficial. The starting time of PUSCH may be fixed as (the last control channel monitoring starting subframe in a period)+(repetition number for control channel)+4. PUCCH may start at the same time of the next control channel monitoring starting subframe.

Figure 14:
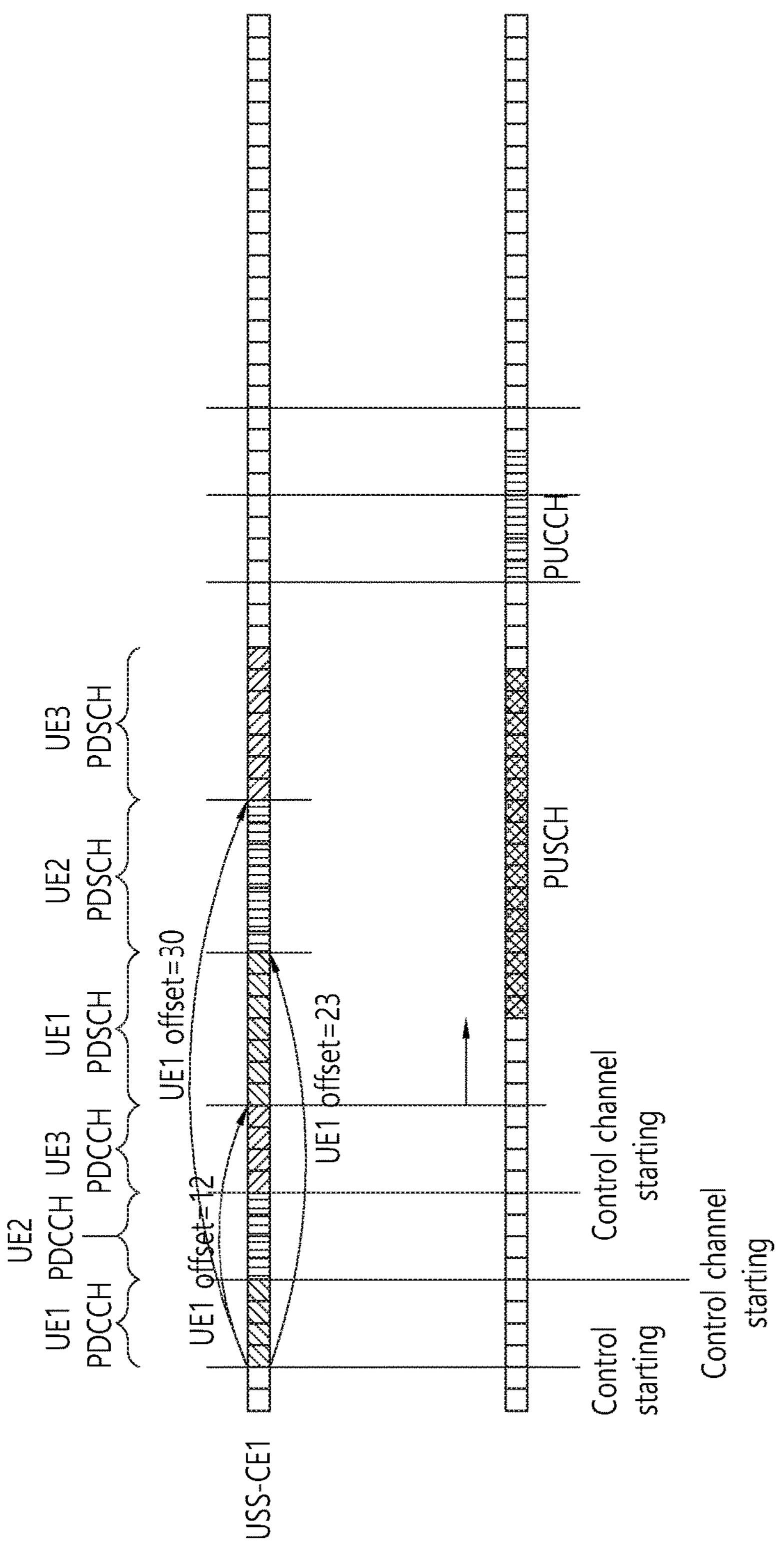
FIG. 14 shows an example of multiple starting subframe set per each period of control channel transmission according to an embodiment of the present invention.

FIG. 14 shows an example of multiple starting subframe set per each period of control channel transmission according to an embodiment of the present invention. Referring to FIG. 14, offset for UE1, offset for UE2 and offset for UE3 are set to 12, 23 and 30, respectively. PUSCH transmission starts at (the last control channel monitoring starting subframe in a period)+(repetition number for control channel)+4. PUCCH starts at the same time of the next control channel monitoring starting subframe.

Figure 15:
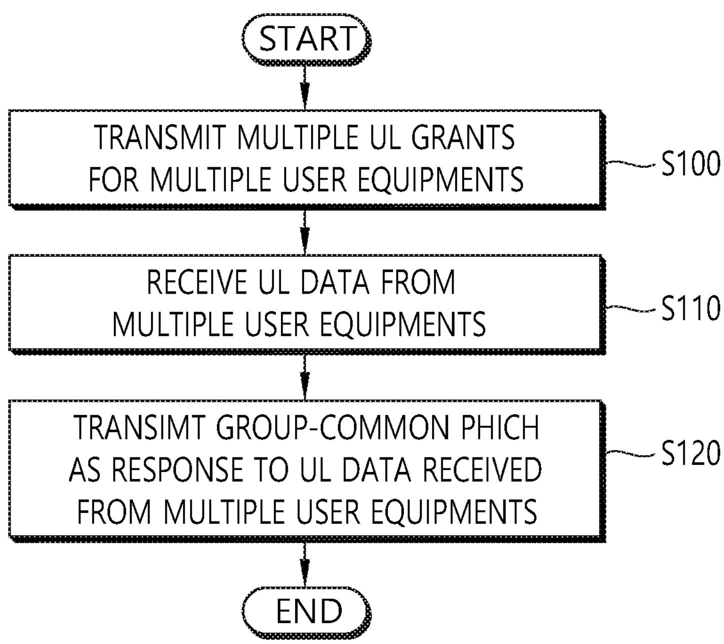
FIG. 15 show a method for transmitting, by a BS, a PHICH according to an embodiment of the present invention.

FIG. 15 show a method for transmitting, by a BS, a PHICH according to an embodiment of the present invention. The present invention described above may be applied to this embodiment of the present invention.

In step S100, the BS transmits multiple UL grants for UEs. The multiple UL grants may be transmitted via different subbands or different times, respectively.

In step S110, the BS receives UL data from the multiple UEs.

In step S120, the BS transmits a group-common PHICH as a response to the UL data received from the multiple UEs.

The group-common PHICH may be transmitted via a dedicated subband. Or, the group-common PHICH is transmitted via a same subband in which a CSS is transmitted. A starting subframe of the group-common PHICH may be aligned with a starting subframe set of a USS. The group-common PHICH may be transmitted per each subband where a UE expect to monitor a USS.

The multiple UL grants may be multiplexed. In this case, a starting time of the UL data from the multiple UEs may be aligned. And, the group-common PHICH may be transmitted by using a number of PHICH resources which is the same as the number of the multiple UL grants. The PHICH resources may be indicated by a bitmap which has a size of the number of PHICH resources. A PHICH resource for each UE among the PHICH resources may be determined as a first next starting subframe of a control channel after transmitting the UL data plus K subframes.

The group-common PHICH may be transmitted per CE level. Or, the group-common PHICH may be common for all CE levels.

Figure 16:
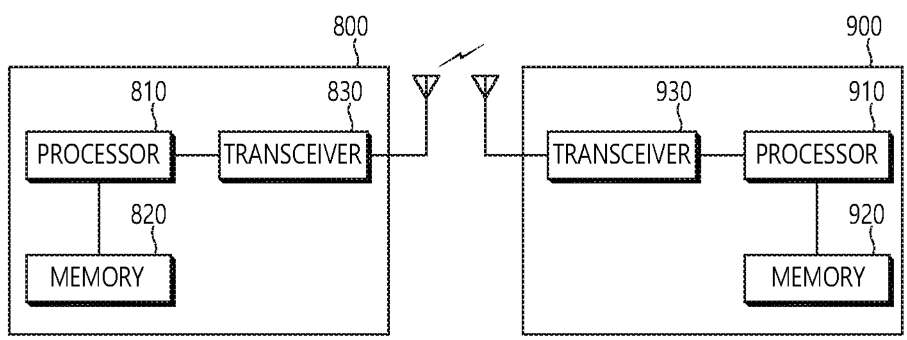
FIG. 16 shows a wireless communication system to implement an embodiment of the present invention.

FIG. 16 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting a group-common physical HARQ indicator channel (PHICH) in a wireless communication system, the method performed by a base station (BS) and comprising:

transmitting multiple uplink (UL) grants for multiple user equipments (UEs);

receiving UL data from the multiple UEs; and transmitting the group-common PHICH to the multiple UEs via a first subband as a response to receiving the UL data, wherein the first subband is same as a subband of a cell-specific search space (CSS) for the multiple UEs, and wherein a starting subframe of the group-common PHICH is aligned with a starting subframe set of a UE-specific search space (USS) for the multiple UEs.

2. The method of claim 1, wherein the multiple UL grants are transmitted via different subbands or different times.

3. The method of claim 1, wherein the multiple UL grants are multiplexed.

4. The method of claim 3, wherein a starting time of the received UL data is aligned.

5. The method of claim 3, wherein the group-common PHICH is transmitted by using a number of PHICH resources which is same as a number of the received multiple UL grants.

6. The method of claim 5, wherein the PHICH resources are informed by a bitmap which has a size of the number of PHICH resources.

7. The method of claim 5, wherein a PHICH resource among the number of PHICH resources for each of the multiple UEs is determined as a next starting subframe of a control channel plus K subframes after transmitting the UL data.

8. The method of claim 1, wherein the group-common PHICH is transmitted for each of a plurality of subbands.

9. The method of claim 1, wherein the group-common PHICH is transmitted for a plurality of coverage enhancement (CE) levels.

10. The method of claim 1, wherein the group-common PHICH is common for all coverage enhancement (CE) levels.

11. A base station (BS) for transmitting a group-common physical HARQ indicator channel (PHICH) in a wireless communication system, the BS comprising:

a memory configured to store information;

a transceiver configured to transmit and receive information; and a processor coupled to the memory and the transceiver and configured to control the transceiver to:

transmit multiple uplink (UL) grants for multiple user equipments (UEs), receive UL data from the multiple UEs; and transmit the group-common PHICH to the multiple UEs via a first subband as a response to receiving the UL data, wherein the first subband is same as a subband of a cell-specific search space (CSS) for the multiple UEs, and wherein a starting subframe of the group-common PHICH is aligned with a starting subframe set of a UE-specific search space (USS) for the multiple UEs.

12. The BS of claim 11, wherein the multiple UL grants are transmitted via different subbands or different times.

13. The BS of claim 11, wherein the multiple UL grants are multiplexed.

14. The BS of claim 13, wherein a starting time of the received UL data is aligned.

15. The BS of claim 13, wherein the group-common PHICH is transmitted by using a number of PHICH resources which is same as a number of the received multiple UL grants.

16. The BS of claim 15, wherein the PHICH resources are informed by a bitmap which has a size of the number of PHICH resources.

17. The BS of claim 15, wherein a PHICH resource among the number of PHICH resources for each of the multiple UEs is determined as a next starting subframe of a control channel plus K subframes after transmitting the UL data.

18. The BS of claim 11, wherein the group-common PHICH is transmitted for each of a plurality of subbands.

19. The BS of claim 11, wherein the group-common PHICH is transmitted for a plurality of coverage enhancement (CE) levels.

20. The BS of claim 11, wherein the group-common PHICH is common for all coverage enhancement (CE) levels.

* * * * *